W. W. CALHOUN.
APPARATUS FOR DESTROYING INSECTS.
APPLICATION FILED OCT. 27, 1913.

1,112,259.

Patented Sept. 29, 1914.

William W. Calhoun, Inventor

Witnesses by C.A. Snow & Co.
Attorneys

UNITED STATES PATENT OFFICE.

WILLIAM W. CALHOUN, OF NEW ORLEANS, LOUISIANA.

APPARATUS FOR DESTROYING INSECTS.

1,112,259.  Specification of Letters Patent.  Patented Sept. 29, 1914.

Application filed October 27, 1913. Serial No. 797,610.

*To all whom it may concern:*

Be it known that I, WILLIAM W. CALHOUN, a citizen of the United States, residing at New Orleans, in the parish of Orleans and State of Louisiana, have invented a new and useful Apparatus for Destroying Insects, of which the following is a specification.

The device forming the subject matter of this application is an apparatus for destroying insects, such as ants and the like.

One object of the present invention is to provide a device of the type above described which may be taken down readily and be readily assembled.

Another object of the invention is to provide a device of the type described including a pan, means being provided for heating the pan circumferentially, thereby to prevent the insects within the pan from moving out the same.

Another object of the invention is to provide a novel means whereby the insect receiving pan may both be heated and be drenched in its interior by poison.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
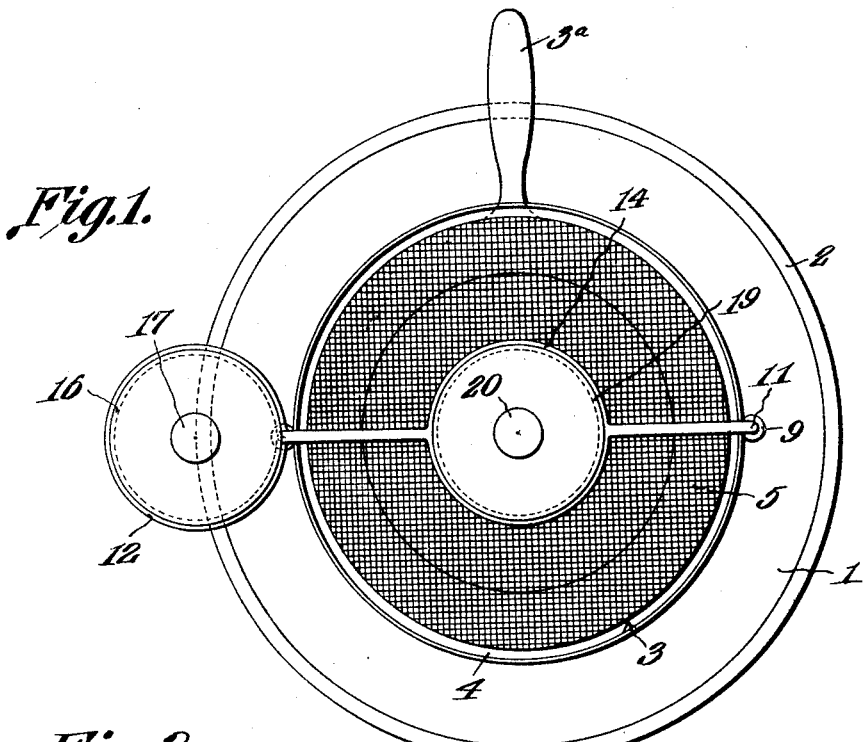
Figure 2:
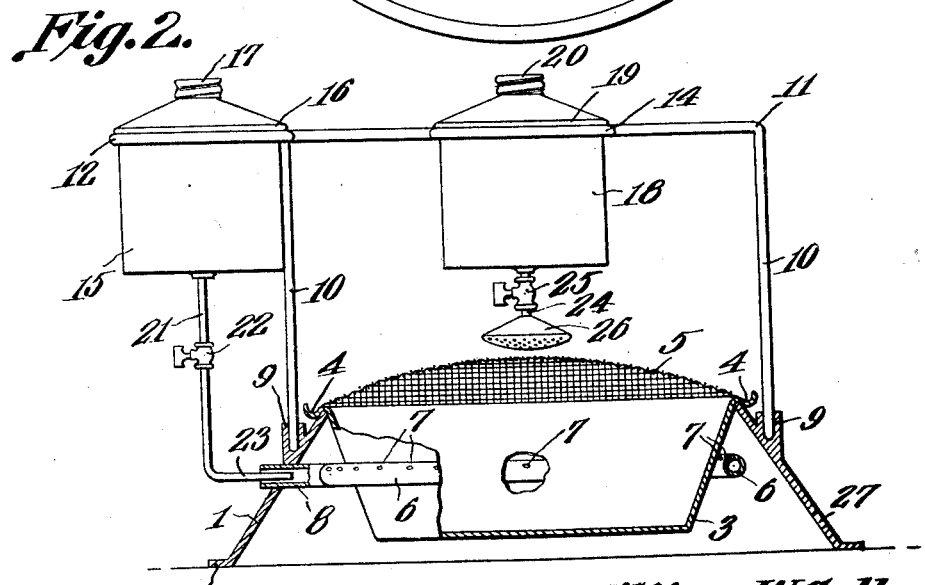

In the accompanying drawing:—Figure 1 shows the invention in top plan; Fig. 2 is a vertical transverse section, in which sundry parts appear in elevation.

In carrying out the present invention there is provided a support 1, preferably in the form of a frusto-conical ring provided at its lower edge with an outstanding, supporting foot or flange 2. Located within the support 1 is a bait receptacle or pan 3 which may be provided with a projecting handle 3ª. Around its upper edge, the pan 3 is provided with a trough 4. The trough 4 exercises three functions. First, it constitutes a means for upholding the pan 3; secondly, it serves to receive the periphery of a foraminous cover 5 for the pan, and third, it constitutes a marginal receptacle surrounding the pan 3 and adapted to receive oil or the like, which may be ignited after the required number of insects have accumulated within the pan. Surrounding the pan 3 and located between the pan and the support 1 is an annular, tubular burner 6, provided with a plurality of openings 7 discharging toward the pan 3. The annular burner 6 is provided with an outstanding extension 8 constituting an air inlet, the extension 8 being secured in the support 1, in order to uphold the burner 6. The extension 8 is open at its outer end. Any suitable means however, may be provided for heating the pan 3.

The support 1 is equipped with upstanding sockets 9, receiving the lower ends of depending legs 10, constituting a part of a U-shaped frame 11. At one side, the frame 11 is equipped with a ring-like extension 12, and the upper, intermediate portion of the frame 11 is provided with a ring-like socket 14. A fuel receptacle 15 extends into the extension 12 and is provided with an outstanding flange 16 which engages the extension 12 to uphold the fuel receptacle. The fuel receptacle 15 is supplied with a suitable closure 17 of any desired sort. Mounted in the ring-like socket 14 is a poison receptacle 18 provided with a flange 19 which, engaging the socket 14, will uphold the poison receptacle. The poison receptacle 18 is supplied with a removable closure 20.

A pipe 21 communicates with the fuel receptacle or tank 15 and extends downwardly, there being a cut off valve 22 interposed in the pipe 21. The pipe 21 terminates at its lower end in an angularly disposed nozzle 23 which enters the air inlet 8. A pipe 24 communicates with the bottom of the poison receptacle 18 and interposed in the pipe 24 is a cut off valve 25. Secured to the lower end of the pipe 24 is a perforated spray head 26.

If desired, the support 1 may be provided with one or more openings 27 for the purpose of providing an exit for the products of combustion.

In practical operation, a suitable bait of any sort is placed in the pan 3 and the cover 5 is mounted in place. Ants or other insects will ascend the inclined wall of the support 1, and, being attracted by the bait in the pan 3, will enter the pan 3 through the foraminous cover 5. After a quantity of insects have accumulated in the pan 3, the valve 22 may be opened, fuel passing from the tank 15 through the pipe 21 and through the nozzle 23 and entering the annular burner 6, air being admitted to the inlet tube 8, and the fuel being ignited at the openings 7 in the burner. By this operation, a zone of the pan 3 will be heated, and the insects will be prevented from traveling upwardly and outwardly from the pan 3.

If desired, the burner 6 may be maintained in operation until the insects have been killed or consumed. However, if desired, while the insects are retained in the pan 3 by the heated zone produced by the burner 6, the valve 25 may be opened, and poison, preferably in the form of a liquid, may be distributed within the pan 3, from the receptacle 18 and by means of the spray head 26.

Especial attention is directed to that portion of the construction which enables the device to be knocked down and set up easily. The cover 5 may be lifted off the pan 3 and the pan 3 may be lifted off the support 1. Likewise, the legs 10 of the frame 11 may be lifted out of the sockets 9, removing the poison receptacle 18 and the tank 15. The poison receptacle 18 may be lifted out of the socket 14 and the fuel tank 15 may be lifted out of the ring-like extension 12. The device, therefore, may be set up readily, and with equal facility taken down for cleaning.

Having thus described the invention, what is claimed is:—

1. An insect destroyer comprising a pan; and a burner surrounding the pan, the burner being adapted to heat a zone of the pan to prevent insects from passing out of the pan.

2. An insect destroyer comprising a pan; a burner surrounding the pan, the burner being adapted to heat a zone of the pan to prevent insects from passing out of the pan; and a source of poison supply discharging into the pan.

3. An insect destroyer comprising a pan; means for heating the pan; and a source of poison supply discharging into the pan.

4. An insect destroyer comprising a support; a pan upheld by the support; a burner discharging against the pan and including an air inlet mounted in the support; and a fuel nozzle discharging within the air inlet.

5. In a device of the class described, a support; a pan upheld by the support; a frame mounted on the support; and a poison receptacle upheld by the frame and discharging within the pan.

6. In a device of the class described, a support; a pan upheld by the support; a burner upheld by the support and discharging against the pan; a frame upheld by the support; a tank mounted on the frame; and means for establishing a communication between the tank and the burner.

7. In a device of the class described, a support; a pan upheld by the support; a foraminous cover for the pan; and a source of poison supply discharging into the pan through the cover.

8. In a device of the class described, a frusto-conical support; a pan extended within the support and provided at its upper end with means to engage the support; a foraminous cover engaged with said means; means for heating a zone of the pan; and a source of poison supply discharging into the pan through the foraminous cover.

9. In a device of the class described, a support; a pan upheld by the support; sockets on the support; a frame having its ends removably seated in the sockets; a poison receptacle upheld by the frame and adapted to discharge into the pan; a fuel tank upheld by the frame and located to one side of the pan; a burner located adjacent the pan; and a connection between the burner and the tank.

In testimony that I claim the foregoing as my own, I have hereto affixed my signature in the presence of two witnesses.

WILLIAM W. CALHOUN.

Witnesses:
JAS. G. SUARBRICK,
C. D. MCCABE.